(12) United States Patent
Kuelzow

(10) Patent No.: US 7,440,934 B2
(45) Date of Patent: Oct. 21, 2008

(54) METHOD AND SYSTEM FOR DECOMPOSING AND CATEGORIZING ORGANIZATIONAL INFORMATION

(76) Inventor: Christopher J. Kuelzow, 78 Buena Vista Ave., Rumson, NJ (US) 07760

( * ) Notice: Subject to any disclaimer, the term of this patent is extended or adjusted under 35 U.S.C. 154(b) by 552 days.

(21) Appl. No.: 10/833,585

(22) Filed: Apr. 28, 2004

(65) Prior Publication Data

US 2005/0246319 A1    Nov. 3, 2005

(51) Int. Cl.
*G06F 7/00* (2006.01)
(52) U.S. Cl. ................... 707/1; 707/7; 707/102
(58) Field of Classification Search ............ 707/1, 707/7, 102
See application file for complete search history.

(56) References Cited

U.S. PATENT DOCUMENTS

| | | | |
|---|---|---|---|
| 6,311,191 B1 | 10/2001 | Retallick | 707/104 |
| 6,574,638 B1 | 6/2003 | Gustman et al. | 707/104.1 |
| 6,625,619 B1 | 9/2003 | McClendon | 707/104.1 |
| 6,687,696 B2 | 2/2004 | Hofmann et al. | 707/6 |
| 6,691,158 B1 | 2/2004 | Douvikas et al. | 709/219 |
| 6,694,331 B2 | 2/2004 | Lee | 707/104.1 |
| 2001/0047290 A1* | 11/2001 | Petras et al. | 705/10 |
| 2002/0049738 A1* | 4/2002 | Epstein | 707/1 |

OTHER PUBLICATIONS

Giovanni M. Sacco, *Dynamic Taxonomies: A Model for Large Information Bases*, IEEE Transactions on Knowledge and Data Engineering, vol. 12, No. 3, May/Jun. 2000, pp. 468-479.

* cited by examiner

*Primary Examiner*—Wilson Lee
*Assistant Examiner*—Michael Le
(74) *Attorney, Agent, or Firm*—F. Chau & Associates, LLC

(57) ABSTRACT

A method for categorizing information of an organization includes presenting a user interface to a user for inputting the information. The user interface includes a plurality of categories including policy category, a process category, a role category and a fact category. The method further includes allowing a user to select at least one category of the plurality of categories, and allowing a user to input under the at least one category he information pertaining to the at least one category.

38 Claims, 22 Drawing Sheets

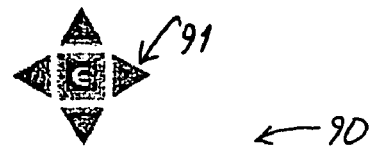

The Smiths (Example) ←—90

- 📇 Lexicon ╱30
  - ◇ Policies ╱100
    - ● Work Product Related ╱101
    - ● Oversight Related ╱102
    - ● Infrastructure Related ╱103      15╲
  - ✱ Processes ╱200
    - ● Work Product Related ╱201
    - ● Oversight Related ╱202
    - ● Infrastructure Related ╱203
  - ☼ Roles ╱300
  - 📇 Facts ╱400
    - ● Applications ╱401
    - ● Databases ╱402
    - ● External ╱403
    - ● Forms ╱404
    - ● Other ╱405
    - ● Reports ╱406
    - ● Subject Matter Experts ╱407
    - ● Templates ╱408

📄 Directory ╱40
🔍 Search ╱50
📊 Dashboards ╱60
✦ Categories ╱65
🖼 Image Store ╱70

⚙ Administration ╱80
  🔒 Security ╱81
  ❓ Help Mgmt ╱83

| Policy | | |
|---|---|---|
| Entities: 4   All A B C D E F G H I J K L M N O P Q R S T U V W X Y Z | | |
| Name | Type | Organization |
| ◇Division of Work Policy | Policy [Work Product Related] | The Smiths (Example) |
| ◇Smith Family Governing Philosophy | Policy [Oversight Related] | The Smiths (Example) |
| ◇Supply Stocking Policy | Policy [Infrastructure Related] | The Smiths (Example) |
| ◇Values and Standards of Conduct Pol... | Policy [Oversight Related] | The Smiths (Example) |

FIGURE 4A

Process
Entities: 2    /21    All A B C D E F G H I J K L M N O P Q R S T U V W X Y Z /22    23

| Name | Type | Organization |
|---|---|---|
| Changing Light Bulb Process | Process [Work Product Related] | The Smiths (Example) |
| Grocery Shopping Process | Process [Work Product Related] | The Smiths (Example) |

FIGURE 4B

| Role  21 | | | 23 |
|---|---|---|---|
| Entities: 3    All A B C D E F G H I J K L M N O P Q R S T U V W X Y Z | | | |
| Name | Type | | Organization |
| ☼ Equipment Maintenance Role | Role | zz | The Smiths (Example) |
| ☼ Financial Management Role | Role | | The Smiths (Example) |
| ☼ Food Preparation and Provisioning R... | Role | | The Smiths (Example) |

FIGURE 4C

| Fact | | |
|---|---|---|
| Entities: 24  All A B C D E F G H I J K L M N O P Q R S T U V W X Y Z | | |
| Name | Type | Organization |
| About Cathy Jones | Fact [Other] | The Smiths (Example) |
| About Christopher Smith | Fact [Other] | The Smiths (Example) |
| About Emily Smith | Fact [Other] | The Smiths (Example) |
| About George Smith | Fact [Other] | The Smiths (Example) |
| About John Smith | Fact [Other] | The Smiths (Example) |
| About Julia Smith | Fact [Other] | The Smiths (Example) |
| About Mary Smith | Fact [Other] | The Smiths (Example) |
| About Maxwell Smith | Fact [Other] | The Smiths (Example) |
| About Olivia Smith | Fact [Other] | The Smiths (Example) |
| Child | Fact [External] | The Smiths (Example) |
| Coupon | Fact [External] | The Smiths (Example) |
| Family | Fact [External] | The Smiths (Example) |
| Father | Fact [External] | The Smiths (Example) |
| Grandfather | Fact [External] | The Smiths (Example) |
| Grandmother | Fact [External] | The Smiths (Example) |
| Grocery Store Check-Out | Fact [External] | The Smiths (Example) |
| Grocery Store | Fact [External] | The Smiths (Example) |
| Hand Basket | Fact [External] | The Smiths (Example) |
| Light Bulb | Fact [External] | The Smiths (Example) |
| Mother | Fact [External] | The Smiths (Example) |
| Parent | Fact [External] | The Smiths (Example) |
| Shopping Cart | Fact [External] | The Smiths (Example) |
| Shopping List Form | Fact [Form] | The Smiths (Example) |
| Time Management Matrix | Fact [External] | The Smiths (Example) |

FIGURE 4D

| Policy [Oversight Related] | | |
|---|---|---|
| Entities: 2   All A B C D E F G H I J K L M N O P Q R S T U V W X Y Z | | 23 |
| Name | Type | Organization |
| ◇Smith Family Governing Philosophy   21 | Policy [Oversight Related]   22 | The Smiths (Example) |
| ◇Values and Standards of Conduct Pol... | Policy [Oversight Related] | The Smiths (Example) |

FIGURE 4E

Policy [Oversight Related]

/21 — Official Name: Values and Standards of Conduct Policy /120

Obsolete AKA(s): /122

Overview: /123 This policy is intended to guide all Smith family members decision making related to moral and ethical matters. As such, it is to be relied upon as family members address the sometimes complicated and difficult challenges of modern living.

/124
Target(s): All Smith family members

/125
Authority/Ownership: Subordinate and conforming to the Smith Family Governing Philosophy Trigger(s): /126

Policy Statement:
/127

Some time ago, the Smith family discovered the following ethical paradigm and has since adopted its tenets. Smith family members are actively encouraged to embrace these principles.

ALL I EVER NEEDED TO KNOW I LEARNED IN KINDERGARTEN

Most of what I really need to know about how to live and what to do and how to be, I learned in kindergarten. Wisdom was not at the top of the graduate school mountain, but there in the sandbox at nursery school.

These are the things I learned: Share everything. Play fair. Don't hit people. Put things back where you find them. Clean up your own mess. Don't take things that aren't yours. Say you're sorry when you hurt somebody. Wash your hands before you eat. Flush. Warm cookies and milk are good for you. Live a balanced life. Learn some and think some and draw and paint and sing and dance and play and work everyday some.

Take a nap every afternoon. When you go out into the world, watch for traffic, hold hands and stick together. Be aware of wonder. Remember the little seed in the plastic cup. The roots go down and the plant goes up and nobody really knows how or why, but we are all like that.

Goldfish and hamsters and white mice and even the little seed in the plastic cup -- they all die. So do we.

An then remember the book about Dick and Jane and the first word you learned, the biggest word of all: LOOK. Everything you need to know is in there somewhere. The Golden Rule and love and basic sanitation, ecology and politics and sane living.

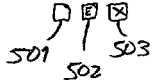
501  502  503

FIGURE 5A

Think of what a better world it would be if we all -- the whole world -- had cookies and milk about three o'clock every afternoon and then lay down with our blankets for a nap. Or if we had a basic policy for our nation and other nations to always put things back where we found them and cleaned up our own messes. And it is still true, no matter how old you are, when you go out into the world, it is best to hold hands and stick together.

*by* Robert Fulghim

128

Organization: The Smiths (Example)

Contacts:

Process [Work Product Related]

Official Name: Changing Light Bulb Process /220 /221

Obsolete AKA(s): -222

Overview: This process is used to replace a failed electrical/lighting /230
component. It specifically addresses routine <u>bulb</u> replacement
223 rather than other device failures such as broken switches,
plugs or power cords.

This process conforms to the Division of Work Policy

Trigger(s): A Parent has been notified or has personally discovered that
an existing light source has failed.
224

/225
Pre-conditions:
- A person acting in the Equipment Maintenance Role has inspected the lamp fixture to determine if the bulb has actually failed or if there is another problem.
- There are replacement parts on-hand.

/226
Flow-of-Events: The person acting in the Equipment Maintenance Role:

- Notes the bulb type and collects a suitable replacement. (He/She makes a note that more inventory should be purchased if this was the last spare.)
- Gathers supporting equipment such as a screwdriver, flashlight, stepstool, etc. which help him/her safely and effectively accomplish the task.
- Turns off the power by unplugging, by turning off the circuit breaker or some other safe method that insures that the device power is off and remains so.
- Removes and discards the defective bulb.
- Installs the replacement.
- Once other lamp components that were removed for this service are replaced, he/she reconnects the power to the lamp.
- Tests the lamp.
- Returns all materials to where they are stored.

227
/
Organization: The Smiths (Example)
Contacts: John Smith
228

FIGURE 5B

☼ Role
　　　　　／321
　　Official Name: Equipment Maintenance Role ← 320　　　　　　　
　Obsolete AKA(s): Handyman
322　　Overview: An individual charged with the Equipment Maintenance
　　　　／　　　　　Role is qualified and responsible for such things as:
　323

- Insuring that all equipment is available, clean, functional and safe.
- Conducting or contracting for the maintenance of family automobiles, lawn equipment, HVAC systems, etc. For example, personally changing the car's oil and filter, replacing the home's heating system air filters or bringing the car to a service center for a more demanding service or repair.
- Providing expert advice to other family members on these topics.

Editor's note: In a family such as the Smiths, it is common to have the Father
　　　　　initially assume all of these responsibilities. However, as the children become
　　　　　older, they are typically assigned many of them.

324
　／
Organization: The Smiths (Example)
　　Contacts: John Smith
　　　／
　　325

| Lexicon - 30 | | |
|---|---|---|
| Entities: 33  All A B C D E F G H I J K L M N O P Q R S T U V W X Y Z | | |
| Name | Type | Organization |
| About Cathy Jones  31 | Fact [Other]  32 | The Smiths (Example)  33 |
| About Christopher Smith | Fact [Other] | The Smiths (Example) |
| About Emily Smith | Fact [Other] | The Smiths (Example) |
| About George Smith | Fact [Other] | The Smiths (Example) |
| About John Smith | Fact [Other] | The Smiths (Example) |
| About Julia Smith | Fact [Other] | The Smiths (Example) |
| About Mary Smith | Fact [Other] | The Smiths (Example) |
| About Maxwell Smith | Fact [Other] | The Smiths (Example) |
| About Olivia Smith | Fact [Other] | The Smiths (Example) |
| Changing Light Bulb Process | Process [Work Product Related] | The Smiths (Example) |
| Child | Fact [External] | The Smiths (Example) |
| Coupon | Fact [External] | The Smiths (Example) |
| Division of Work Policy | Policy [Work Product Related] | The Smiths (Example) |
| Equipment Maintenance Role | Role | The Smiths (Example) |
| Family | Fact [External] | The Smiths (Example) |
| Father | Fact [External] | The Smiths (Example) |
| Financial Management Role | Role | The Smiths (Example) |
| Food Preparation and Provisioning R... | Role | The Smiths (Example) |
| Grandfather | Fact [External] | The Smiths (Example) |
| Grandmother | Fact [External] | The Smiths (Example) |
| Grocery Shopping Process | Process [Work Product Related] | The Smiths (Example) |
| Grocery Store | Fact [External] | The Smiths (Example) |
| Grocery Store Check-Out | Fact [External] | The Smiths (Example) |
| Hand Basket | Fact [External] | The Smiths (Example) |
| Light Bulb | Fact [External] | The Smiths (Example) |
| Mother | Fact [External] | The Smiths (Example) |
| Parent | Fact [External] | The Smiths (Example) |
| Shopping Cart | Fact [External] | The Smiths (Example) |
| Shopping List Form | Fact [Form] | The Smiths (Example) |
| Smith Family Governing Philosophy | Policy [Oversight Related] | The Smiths (Example) |
| Supply Stocking Policy | Policy [Infrastructure Related] | The Smiths (Example) |
| Time Management Matrix | Fact [External] | The Smiths (Example) |
| Values and Standards of Conduct Pol... | Policy [Oversight Related] | The Smiths (Example) |

FIGURE 7

| Directory | | | | 🗖 🗵 |
|---|---|---|---|---|
| Name | Phone | | email | Organization |
| Jones, Cathy | 702.876.5432 | 41 | cjones@grandma.com | The Smiths (Example) |
| Smith, Christopher | 212.234.5678 | | chris@smith.com | The Smiths (Example) |
| Smith, Emily | 212.234.5678 | | emily@smith.com | The Smiths (Example) |
| Smith, George | 518.321.7654 | | gsmith@grandpa.com | The Smiths (Example) |
| Smith, John | 212.234.5678 | | dad@smith.com | The Smiths (Example) |
| Smith, Julia | 212.234.5678 | | julia@smith.com | The Smiths (Example) |
| Smith, Mary | 212.234.5678 | | mom@smith.com | The Smiths (Example) |
| Smith, Maxwell | 212.234.5678 | | max@smith.com | The Smiths (Example) |
| Smith, Olivia | 212.234.5678 | | olivia@smith.com | The Smiths (Example) |

FIGURE 8A

| Process | | | | | | | | | | |
|---|---|---|---|---|---|---|---|---|---|---|
| Normal | Verdana | | | A | B | I | U | S | X² X₂ | |

221

551  552  553  554

Official Name: Changing Light Bulb Process

222 — AKA(s):

Overview: This process is used to replace a failed electrical lighting component. It specifically addresses routing bulb replacement rather than other device failures such as broken switches, plugs or power cords.

223

224 — This process conforms to the Division of Work Policy

Trigger(s): A parent has been notified or has personally discovered that an existing light source has failed

225

Pre-Conditions:
- A person acting in the Equipment Maintenance Role has inspected the lamp fixture to determine if the bulb has actually failed or if there is another reason for the problem.
- There are replacement parts on hand.

226

Flow-of-Events: The person acting in the Equipment Maintenance Role:
- Notes the bulb type and collects a suitable replacement. (He/She makes a note that more inventory should be purchased if this was the last spare.)
- Gathers supporting equipment such as a screwdriver, flashlight, stepstool, etc. Which help him/her safely and effectively accomplish the task.
- Turns off the poser by unplugging, by turning off the circuit breaker or some other safe method that insures that the device power is off and remains so.
- Removes and discards the defective bulb.
- Installs the replacement.
- Once other lamp components that were removed for this service are replaced, he/she reconnects the power to the lamp.
- Tests the lamp.
- Returns all materials to where they are stored.

227

228

Org: The Smiths

529 Contacts John Smith

530 Visibility: Public

Category: All

Fig. 11

METHOD AND SYSTEM FOR DECOMPOSING AND CATEGORIZING ORGANIZATIONAL INFORMATION

BACKGROUND OF THE INVENTION

1. Technical Field

The present disclosure relates to a method and system for decomposing and categorizing organizational information.

2. Discussion of the Related Art

Businesses are always looking for ways to increase their efficiency and maximize profits. Increased revenue can be achieved by minimizing the costs of producing or providing products or services. Further, if such costs are maintained at a consistent level, businesses may formulate prices that accurately reflect their desired profit margins.

Critical business information and the ease of access thereto by employees, suppliers, clients and customers is one way of eliminating waste and increasing productivity within an organization. For example, employees performing a task for the first time are able to complete the task in a more efficient and consistent manner when they can learn how the organization expects the task to be performed. Accordingly, granting employees easy access to key information about the organization and/or to individuals/employees with useful information can eliminate wasteful attempts at completing the task and increase productivity.

Some known attempts to streamline the flow of information within organizations include databases and electronic libraries of useful information, and tools for electronic management of products and business events and contacts. Also, computer-based solutions for locating experts on specific subjects within an organization and for gathering business information from e-mail have been proposed.

However, the known attempts are either product or task specific. For example, known databases address specific parts of a business, such as technical specifications, inventory, and customer lists. Although useful to some extent, these databases are not designed to fit within a general structure of business information and their utility is limited to a small sampling of tasks and employees. Similarly, the tools for electronic management of products or business contacts, and the solutions for locating experts or analyzing e-mail are limited to certain tasks within an organization, thereby limiting their usefulness to the entire organization.

None of the known attempts provide a useful taxonomy for categorizing information and procedures that can be commonly applied to different organizations to cover all functional aspects of each organization.

Accordingly, a need exists for a method and system for structuring organizational information that is applicable to multiple organizations and facilitates access to critical data.

SUMMARY OF THE INVENTION

A method for categorizing information of an organization, in accordance with an embodiment of the present invention, comprises presenting a user interface to a user for inputting the information, the user interface comprising a plurality of categories including a policy category, a process category, a role category and a fact category, allowing the user to select at least one category of the plurality of categories, and allowing the user to input under the at least one category the information pertaining to the at least one category.

The at least one category may include a sub-category and the method may further comprise allowing the user to input under the sub-category the information pertaining to the sub-category. The user interface may further comprise the policy category and/or the process category divided into at least one of a work product category, an oversight category and an infrastructure category. The user interface may further comprise the fact category divided into at least one of an application category, a database category, an external category, a form category, an other category, a report category, an expert category and a template category.

In accordance with another embodiment of the present invention, a program storage device readable by a machine, tangibly embodying a program of instructions executable by the machine to perform method steps for categorizing information of an organization is provided. The method steps comprise presenting a user interface to a user for inputting the information, the user interface comprising a plurality of categories including a policy category, a process category, a role category and a fact category, allowing the user to select at least one category of the plurality of categories, and allowing the user to input under the at least one category the information pertaining to the at least one category.

A system for categorizing information of an organization, in accordance with another embodiment of the present invention, comprises means for presenting a user interface to a user for inputting the information, the user interface comprising a plurality of categories including a policy category, a process category, a role category and a fact category, means for selecting at least one category of the plurality of categories, and means for inputting under the at least one category the information pertaining to the at least one category.

Another method for categorizing information of an organization, in accordance with an embodiment of the present invention, comprises presenting a user interface to a user for displaying the information, the user interface comprising a plurality of categories including a policy category, a process category, a role category and a fact category, allowing the user to select at least one category of the plurality of categories, and displaying the information pertaining to the at least one category.

Another method for categorizing information of an organization, in accordance with an embodiment of the invention, comprises presenting a user interface to a user for inputting the information, the user interface comprising at least one of a policy category, a process category, a role category and a fact category, allowing the user to select at least one of the policy category, the process category, the role category and the fact category, and allowing the user to input under the selected category the information pertaining to the selected category.

In accordance with an embodiment of the invention, a server connected to at least one client through a network includes a computer readable code embodied therein for causing a computer to perform method steps for categorizing information of an organization. The method steps comprise forwarding from the server to the at least one client a first interface for selecting at least one category of a plurality of categories, wherein the plurality of categories include at least one of a policy category, a process category, a role category and a fact category, receiving at the server a selection of the at least one category from the at least one client, forwarding a second interface for inputting under the at least one category the information pertaining to the at least one category from the server to the at least one client in response to the received selection, and receiving at the server inputted information pertaining to the at least one category from the at least one client.

BRIEF DESCRIPTION OF THE DRAWINGS

Preferred embodiments of the invention can be understood in more detail from the following descriptions taken in conjunction with the accompanying drawings in which:

FIGS. 3A-3B show a navigation control cluster displayed on a computer screen, according to an embodiment of the present invention; and FIG. 4A shows a policy list displayed on a computer screen, according to an embodiment of the present invention;

FIG. 4B shows a process list displayed on a computer screen, according to an embodiment of the present invention;

FIG. 4C shows a role list displayed on a computer screen, according to an embodiment of the present invention;

FIG. 4D shows a fact list displayed on a computer screen, according to an embodiment of the present invention;

FIG. 4E shows a policy list displayed on a computer screen, according to an embodiment of the present invention;

FIG. 5A shows a narrative associated with a policy displayed on a computer screen, according to an embodiment of the present invention;

FIG. 5B shows a narrative associated with a process displayed on a computer screen, according to an embodiment of the present invention;

FIG. 5C shows a narrative associated with a role displayed on a computer screen, according to an embodiment of the present invention;

FIG. 5D shows a narrative associated with a fact displayed on a computer screen, according to an embodiment of the present invention;

FIG. 7 shows a lexicon list displayed on a computer screen, according to an embodiment of the present invention;

FIG. 8A shows a directory displayed on a computer screen, according to an embodiment of the present invention;

FIG. 11 shows a narrative associated with a process in an edit mode displayed on a computer screen, according to an embodiment of the present invention.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

The embodiments of the present invention relate to computer implemented systems and methods for categorizing information and procedures of organizations. The systems and methods for structuring the organizational information can be commonly applied to different organizations and are applicable to all functional aspects of each organization.

The embodiments described herein may be implemented in various forms of hardware, software, firmware, special purpose processors, or a combination thereof. Preferably, the embodiments described herein are implemented in software as applications comprising program instructions that are tangibly embodied on one or more program storage devices (e.g., magnetic floppy disk, RAM, CD ROM, ROM and Flash memory), and executable by any device or machine comprising a suitable architecture. Further, since the constituent system modules and method steps described herein are preferably implemented in software, the actual connections between the system components (or the flow of process steps) may differ depending upon the manner in which the embodiments of the present invention are programmed. Given the teachings herein, one of ordinary skill in the related art will be able to contemplate these and similar implementations or configurations of the embodiments of the present invention.

Figure 1:
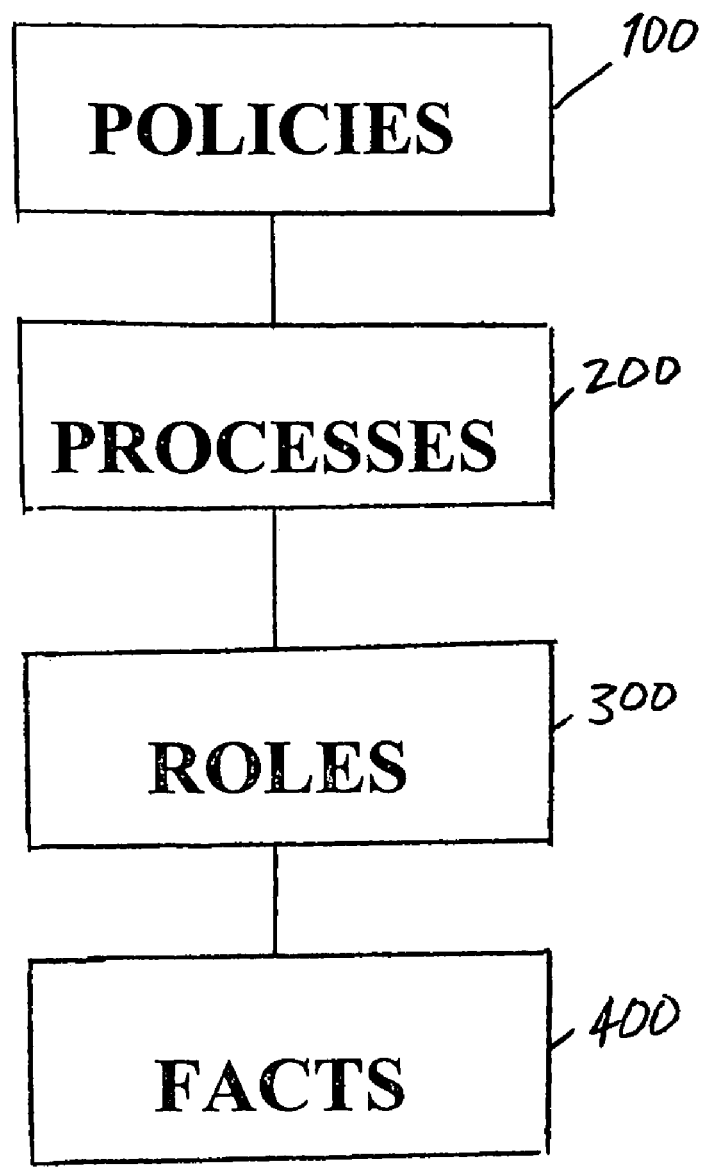
FIG. 1 is a block diagram showing categories for organizing information of an organization, according to an embodiment of the present invention.

Referring to FIG. 1, in accordance with an embodiment of the present invention, information from an organization is organized into Policies 100, Processes 200, Roles 300 and Facts 400. Information from multiple organizations, regardless of content, can be effectively managed through this paradigm. The terms "Policies", "Processes", "Roles" and "Facts" are convenient labels referring to different categories of organizational information. Different labels referring to the same categories of information may be used without departing from the scope or spirit of the invention.

As used herein, a "Policy" refers to a fundamental directive (often formally published), which is intended to insure that processes crafted and subordinate actions taken conform with and support the mission of an organization through sanctioned means. Policies are created to provide uniform guidance in support of organizational decisions and activities, and are often broadly applied and long lived.

As used herein, a "Process" refers to a formalized, sanctioned and required flow-of-events detailing some specific pursuit that adds value. A process may include, for example, a method of manufacturing a product of the organization. Processes may include detailed instructions, methods and requirements for completing a task.

As used herein, a "Role" refers to a function performed in a particular operation or process. Any individual or entity performing activities as permitted and/or demanded by a process is said to be acting in the context of a defined role. Anyone or anything can be qualified or called upon to perform any number of roles regardless of their current title within the organization.

As used herein, a "Fact" refers to something that exists, has been demonstrated to exist or known to have existed. A fact also refers to something that has been done, for example, a real occurrence or event. Facts also include knowledge or information based on real occurrences.

Figure 2A:
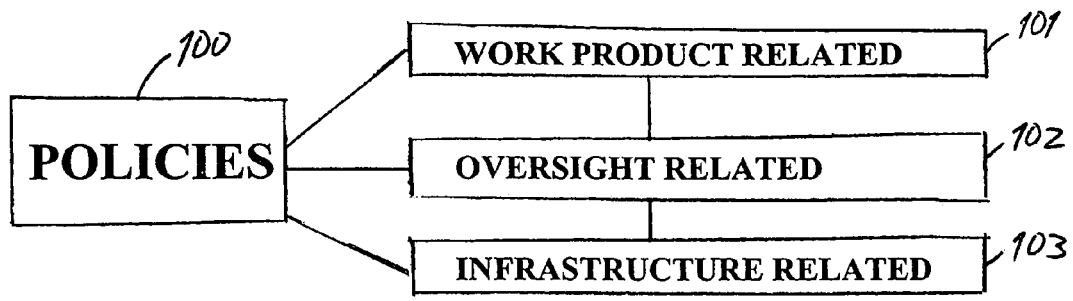
FIGS. 2A-2C are block diagrams showing categories and sub-categories for organizing information of an organization, according to an embodiment of the present invention.

Referring to FIG. 2A, Policies 100 are divided into three sub-categories, Work Product Related 101, Oversight Related 102, and Infrastructure Related 103.

Work product related policies 101 refer to governing directives focused on the production or provision of items that add value, such as the products or services offered by the organization. For example, a division of work policy is a work product related policy, whereby members of the organization are guided in decision making as to the fair and balanced assignment of work.

Oversight related policies 102 refer to governing directives focused on relationship, behavior, performance, audit and compliance matters. Oversight related policies 102 are typically created to provide guidance on subjects related to monitoring performance and the 'protection' of the organization. For example, a values and standards of conduct policy is an example of an oversight related policy 102. Such a policy may include directives related to ethical conduct and sexual harassment.

Infrastructure related policies 103 refer to governing directives created to facilitate and support processes that add value to the organization. While not directly contributing to the processes to produce or provide the items that add value to the organization, they are intended to positively influence the pursuit of same. An example of an infrastructure related policy 103 is a supply stocking policy, whereby directives are set forth governing the stocking and ordering of supplies used in the processes that produce or provide the products or services of the organization.

Figure 2B:
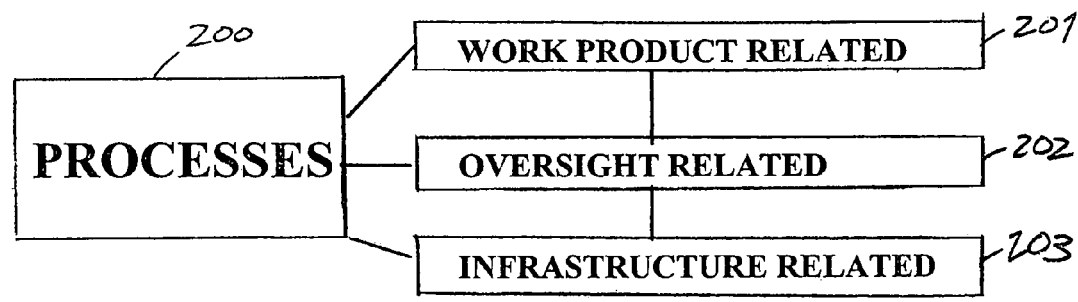

Referring to FIG. 2B, Processes 200 are divided into three sub-categories, Work Product Related 201, Oversight Related 202, and Infrastructure Related 203.

Work product related processes 201 refer to those processes used to produce or provide products or services offered by the organization and which add value. Typically, work product related processes 201 are the processes that generate revenue for the organization and that are most clearly associated with the organization's responsibilities, contributions and mission. A work product related process 201 may be supported by infrastructure related processes 202 and/or influenced by oversight related processes 203. For example, a method of manufacturing a product of the organization is a work product related process 201.

Oversight related processes 202 refer to those processes that help organizations comply with business administrative policies/directives. Oversight related processes 202 may include "checks and balances" created to inform or protect the company as the products or services offered by the organization are routinely produced. For example, oversight related processes 202 can be processes for conducting an audit, filing a grievance or governing a hearing for an employee accused of unethical conduct.

Infrastructure related processes 203 refer to those processes that support and/or facilitate efforts to produce or provide the products or services of the organization. The infrastructure related processes are tools that are used during the creation of the items that add value to the organization. Examples of infrastructure related process 203 may include mailroom and secretarial procedures.

Figure 2C:
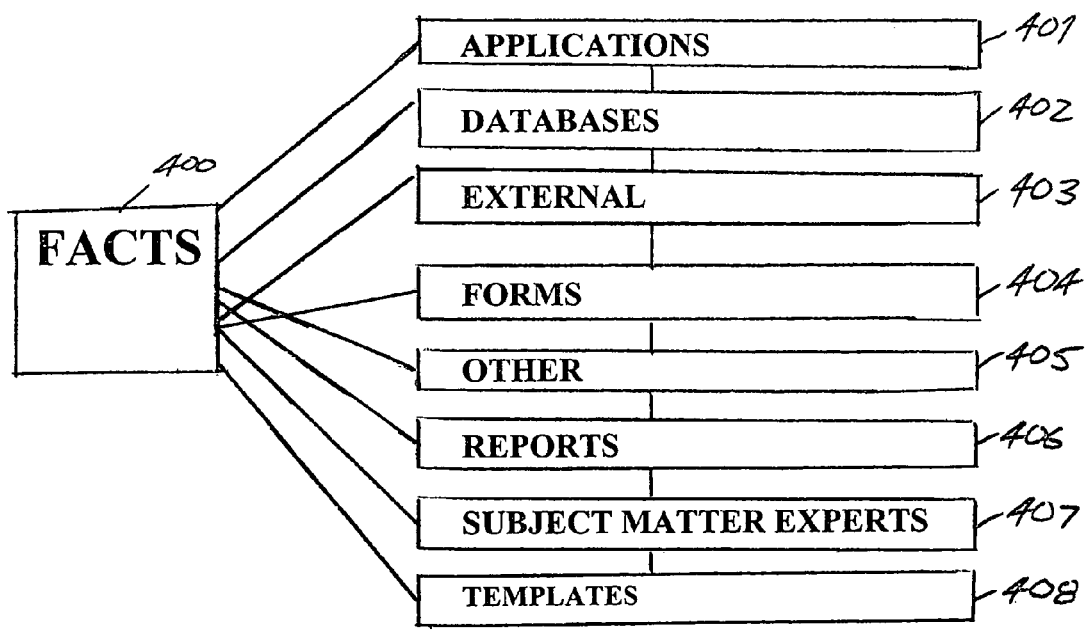

Referring to FIG. 2C, Facts 400 are divided into eight sub-categories, Applications 401, Databases 402, External 403, Forms 404, Other 405, Reports 406, Subject Matter Experts 407 and Templates 408.

An application 401 refers to a software-based work product aid deployed to accomplish or support internal and/or external activities of the organization. Examples of applications 401 may include the MICROSOFT WORD word-processing application and the COREL Photo House photo editing application.

A database 402 refers to a repository of information that may be acted upon through applications or individual ad-hoc queries. Databases 402 provide a means to efficiently store or retrieve large amounts of information. The term database may refer to the actual collection of information or the computer software that manages the collection of information.

An external fact 403 refers to fact established outside of an organization. External facts 403 reference entities, services, relationships, constraints or some other given set of circumstances outside of the realm of the organization. Examples of external facts include The Periodic Table of Elements, a supplier's inventory/shipping system, a recording artist's tour schedule, legal constraints, such as statutes and regulations, and a vendor from whom the organization purchases goods and/or services (e.g., raw materials, components, office supplies, energy, insurance, payroll, advertising, clinical testing). External facts 403 can be completely documented or briefly described.

A form 404 refers to a data vehicle in paper or electronic form that is used to coalesce and carry information. A form 404 can be used to support or initiate an action. Examples of forms 404 include an invoice, a facsimile cover sheet and an employment application.

Other 405 refers to a fact established within the enterprise, such as an entity, service, relationship, constraint or some other given set of circumstances within the organization. Examples of other facts 405 include definitions, a department or division within the enterprise, a company accounts payable system that a department feeds, and a department where users are required to send reports. Like external facts 403, other facts 405 can be completely documented or briefly described.

A report 406 refers to a data presentation vehicle in paper or electronic form that is used to provide information. Examples of reports 406 include an annual report, marketability studies and a summary of recent developments in the law.

A subject matter expert (SME) 407 refers to an individual or entity with relevant specialized knowledge and/or skills. Examples of SMEs 407 include consultants, librarians, IT specialists and scientific advisors.

A template 408 refers to a data structure in paper or electronic form used as a starting point or reference when attempting to complete a task. Templates 408 facilitate reuse of a prior approach, structure and/or data processing methods. Examples of templates 48 include previously written letters or agreements.

It should be understood that different labels referring to the same sub-categories of information may be used without departing from the scope or spirit of the invention. Further, it should also be understood that in some situations certain information may fit into more than one category or sub-category.

Preferably, the embodiments of the invention are executed in an on-line, web-based application that presents the organizational information to a user in terms of the categories and sub-categories defined with reference to FIGS. 1 and 2A-2C.

Figure 12:
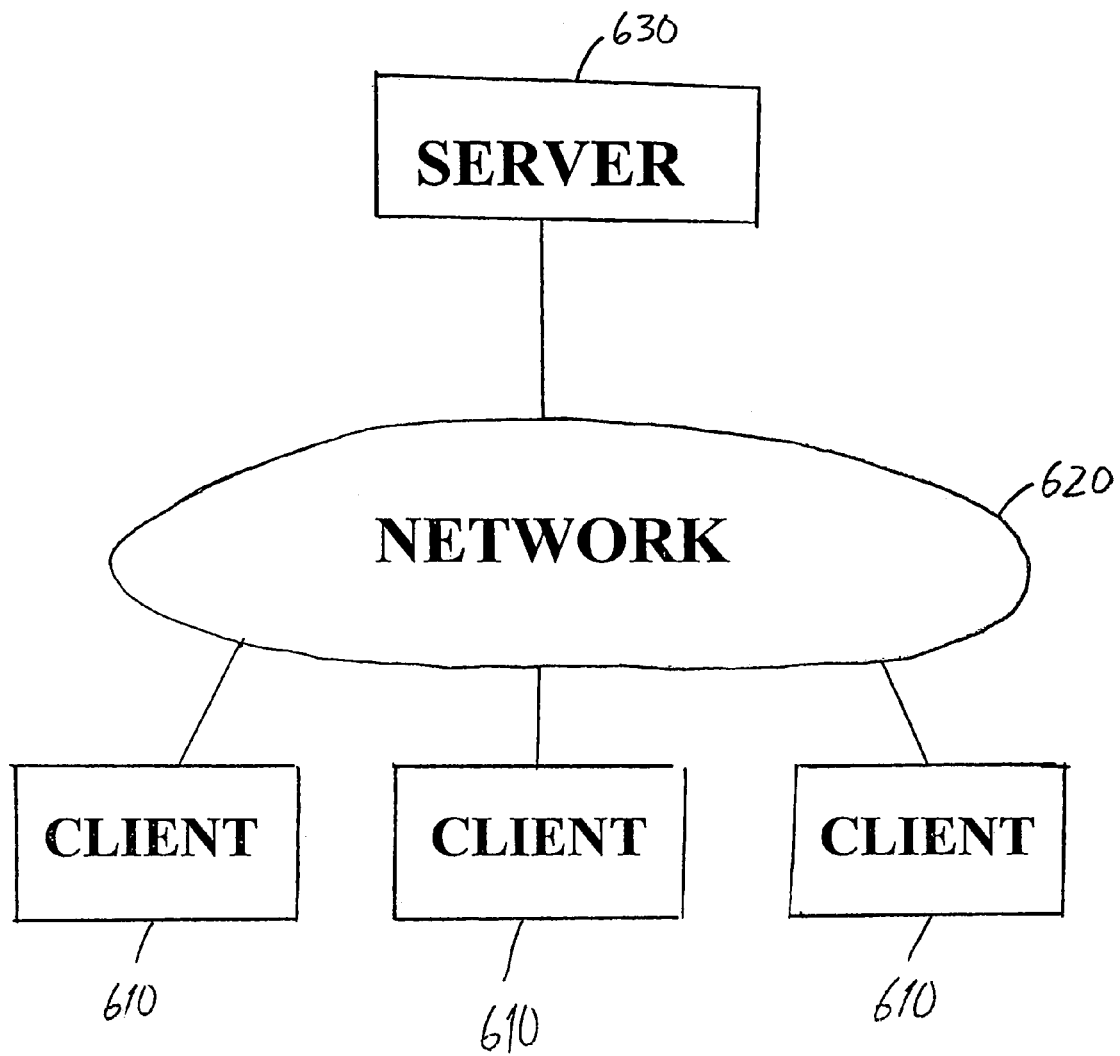
FIG. 12 is a block diagram showing a network connection between a central server and clients, according to an embodiment of the present invention.

For example, a central computer system or systems, such as a mainframe, personal computer (PC), handheld computer, server etc., includes programs or modules implementing the embodiments of the invention. Referring to FIG. 12, a central server 630 is accessible by a number of users or clients 610 using, for example, PCs, laptop computers, personal digital assistants (PDAs) or cellular telephones via an information network 620 such as the Internet, an Intranet, a local area network (LAN), a wide area network (WAN), PSTN (public switched telephone network), an ad hoc network, such as Bluetooth or any combination thereof. Communication between users and the central server, for example, may be established through any suitable information protocol known to those of ordinary skill in the art, such as internet protocol (IP), transmission control protocol (TCP), etc.

It is to be appreciated that, depending on the device (e.g., PC, PDA, cellular telephone) used to access the central server 630, a connection may be made, for example, using a dial-up connection through a modem or ISP (internet service provider), an HTML (hyper text markup language) browser, or a VoiceXML (voice extensible markup language) browser using VOIP (voice over internet protocol).

It is to be appreciated that depending on the configuration of the device used to access the central server, different types of user interfaces (UIs) may be used. For example, a graphical user interface (GUI) or a voice driven user interface may be used. Preferably, the GUIs illustrated in the screen layouts and models shown in the FIGS. 3-11 are used. However, those GUIs are for reference when describing the embodiments of the invention and the embodiments of the invention are not limited to same.

Figure 3B:
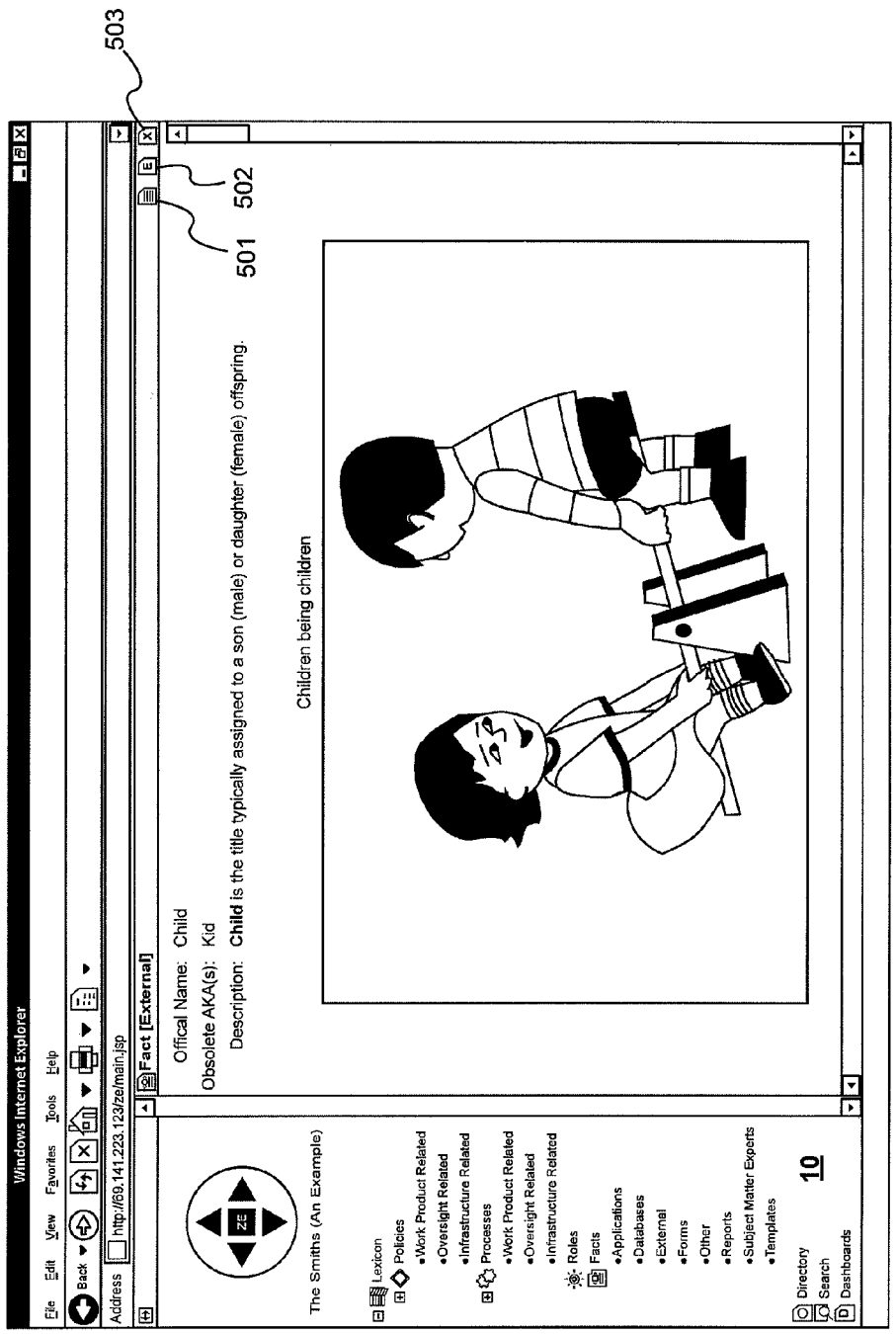

Referring to FIGS. 3A and 3B, a navigation control cluster 10 is shown as it would be seen on the screen of a user. The navigation control cluster 10 allows users to intuitively and quickly navigate to find desired information about the organization. A user's movement and access to different parts of the navigation control cluster 10 may be limited by predetermined security clearances depending on the user's status.

The navigation control cluster 10 includes the policies, processes, roles and facts categories 100, 200, 300, and 400 and the associated sub-categories 101-103, 201-203 and 401-408. In operation, each category and its sub-categories are listed in drop-down form so that a user utilizing a point and click operation of a mouse can respectively reveal and hide sub-categories by clicking on plus and minus signs 15 located next to the category labels.

As shown in FIGS. 3A and 3B, a model organization, shown in the area 90 at the top of the navigation control cluster is referred to as "The Smiths". The model organization is being used to illustrate how the embodiments of the invention are applied to an organization. It is to be understood that the model organization is being used for illustrative purposes only and the invention is not limited to this model organization. The Smiths represent a standard family.

Referring to FIGS. 4A-4D, if a user clicks on any of the categories 100, 200, 300 or 400 in the navigation control cluster 10, the screen displays a list of each policy 100, process 200, role 300 or fact 400 within the system. As shown in FIG. 4A, with respect to each policy, a name 21, a type 22, and the organization 23 to which it pertains are listed in table form. Similarly, as shown in FIGS. 4B-4D, with respect to each process 200, role 300 and fact 400, names 21, types 22 and organizations 23 to which they pertain are listed in table form. As shown in FIG. 4E, if a user clicks on a sub-category on the navigation control cluster 10, such as oversight related policies 102, the screen will display only a list of the oversight related policies and the name 21, type 22 and organization 23 of same.

Figure 5D:
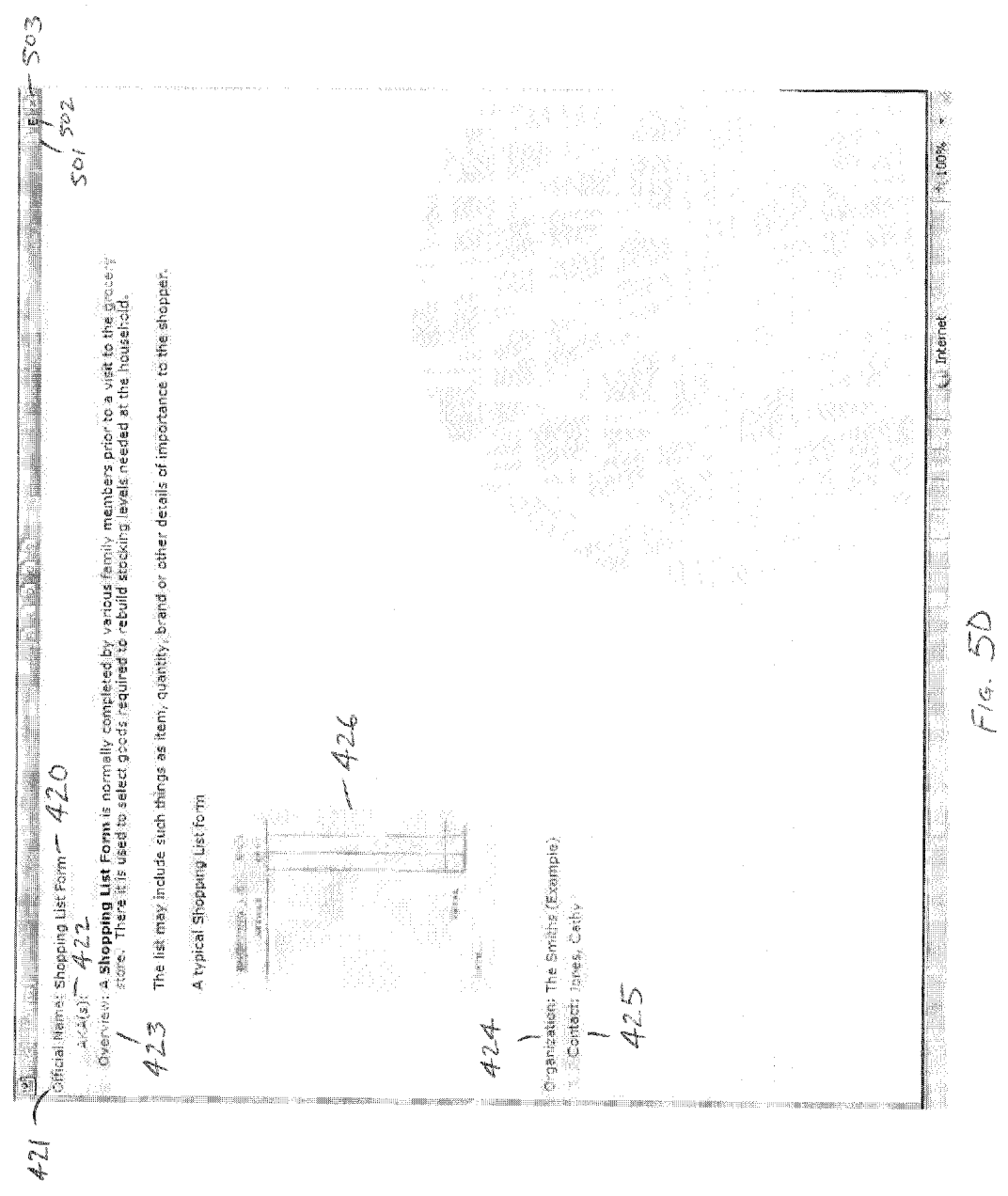

Referring to FIGS. 5A-5D, by clicking on a specific policy 100, process 200, role 300, or fact 400 shown in FIGS. 4A-4E, a user may display a narrative associated with same. As shown in FIG. 5A, the "Values and Standards of Conduct Policy" 120 is displayed with specific information such as, the official policy name 121, AKA(s) 122, a general policy overview 123, targets 124 outlining those to whom the policy pertains, authority/ownership 125 outlining other policies affecting the policy or organizations controlling the policy, triggers 126 laying out the occurrence of events resulting in institution of the policy, a detailed policy statement 127, the organization to which the policy pertains 128 and any contacts 129 having specialized knowledge or information about the policy.

Similarly, as shown in FIG. 5B, a process 200, such as the "Changing Light Bulb Process" 220 is displayed with information such as, the official name 221, AKA(s) 222, a general overview 223, triggers 224 outlining the occurrence of events causing institution of the process, pre-conditions 225 required to exist before the process takes place, a flow-of-events 226 outlining the steps of the process, the organization to which the process pertains 227 and any contacts 228 having specialized knowledge or information about the process.

As shown in FIG. in 5C, a role 300, such as the "Equipment Maintenance Role" 320 is displayed with information such as the official name 321, AKA(s) 322, an overview 323 describing the role, the organization to which the role pertains 324 and any contacts 325 having specialized knowledge or information about the role.

As shown in FIG. in 5D, a fact 400, such as the "Shopping List Form" 420 is displayed with information such as the official name 421, AKA(s) 422, an overview 423 describing the fact, the organization to which the fact pertains 424 and any contacts 425 having specialized knowledge or information about the fact. An image, such as the shopping list form image 426, can be inserted into the narrative of a policy 100, process 200, role 300 or fact 400 to further explain same.

It is to be understood that more or less information may be displayed with respect to each policy 100, process 200, role 300 or fact 400 and the invention is not limited to the specific displays of information shown in FIGS. 5A-5D.

Figure 6:
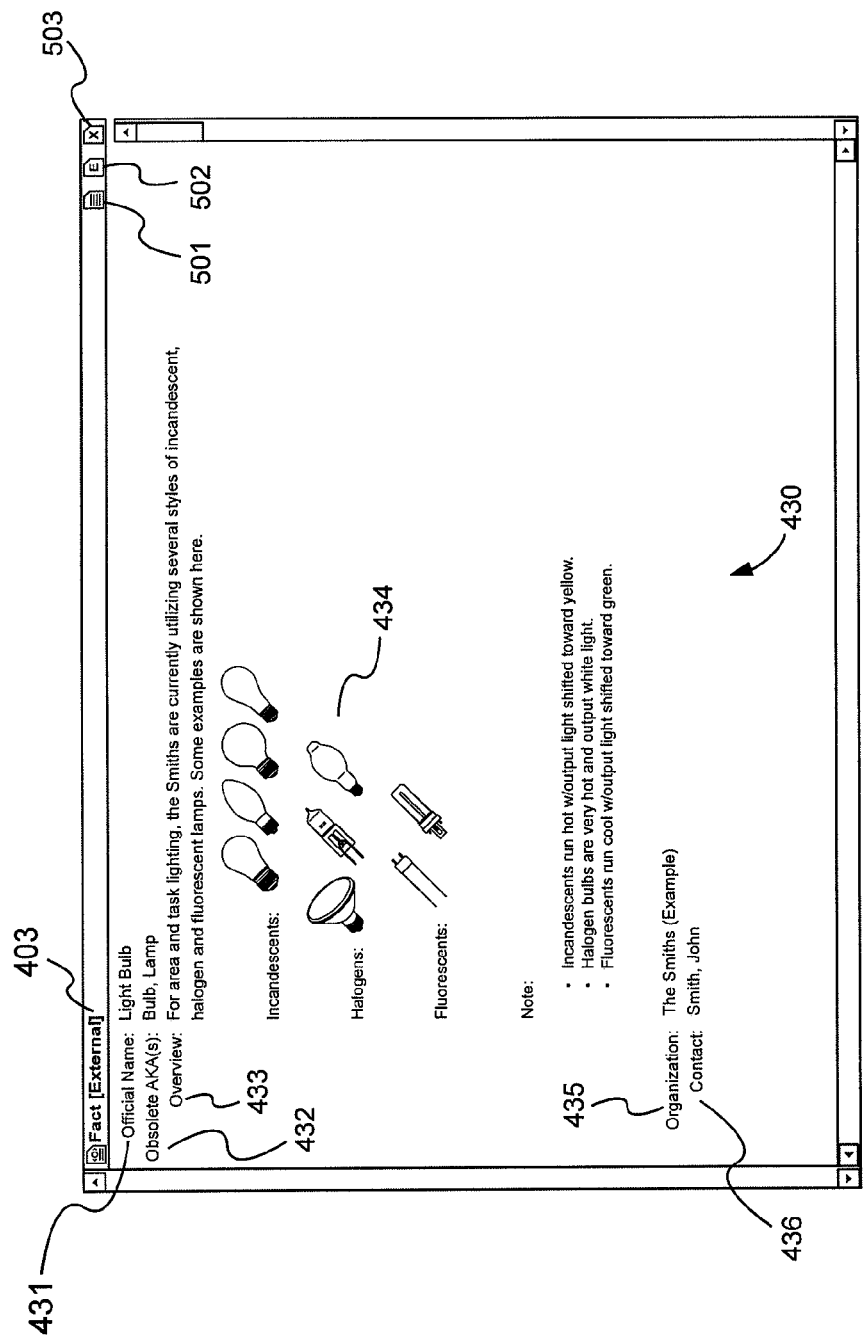
FIG. 6 shows a narrative associated with a fact used as a hyperlink displayed on a computer screen, according to an embodiment of the present invention.

Referring to FIGS. 5B and 6, a hyperlink 230 can be provided in the narrative of a policy 100, process 200, role 300 or fact 400 to further describe the content of the narrative. For example, in FIG. 5B, the term bulb 230 is hyperlinked to the description of light bulbs 430 as shown in FIG. 6, which is categorized as an external fact 403. Therefore, when a user clicks on the hyperlink 230, the page shown in FIG. 6 is displayed for the user. The hyperlinked description 430 can include information such as the official name 431, AKA(s) 432, an overview 433 including images 434, the organization 435 and any contacts 436 having specialized knowledge or information. Hyperlinks within a narrative may be to internal pages of the web-based application (e.g., pages on the same server as the web-based application) or to external websites on the Internet.

Referring back to FIGS. 3A and 3B, the navigation control cluster 10 includes additional areas on which a user may click to navigate through an organization. The additional areas include Lexicon 30, Directory 40, Search 50, Dashboards 60, Categories 65, Image Store 70 and Administration 80. Referring to FIG. 7, when a user clicks on lexicon 30 in the navigation control cluster 10, the user is provided with an alphabetical list of words or phrases representing the important terms within the system. For example, all of the policies 100, processes 200, roles 300 and facts 400 are listed in alphabetical order by name 31, and are listed with their type 32 laying out their respective categories and sub-categories, and the organization 33 to which they pertain.

Figure 8B:
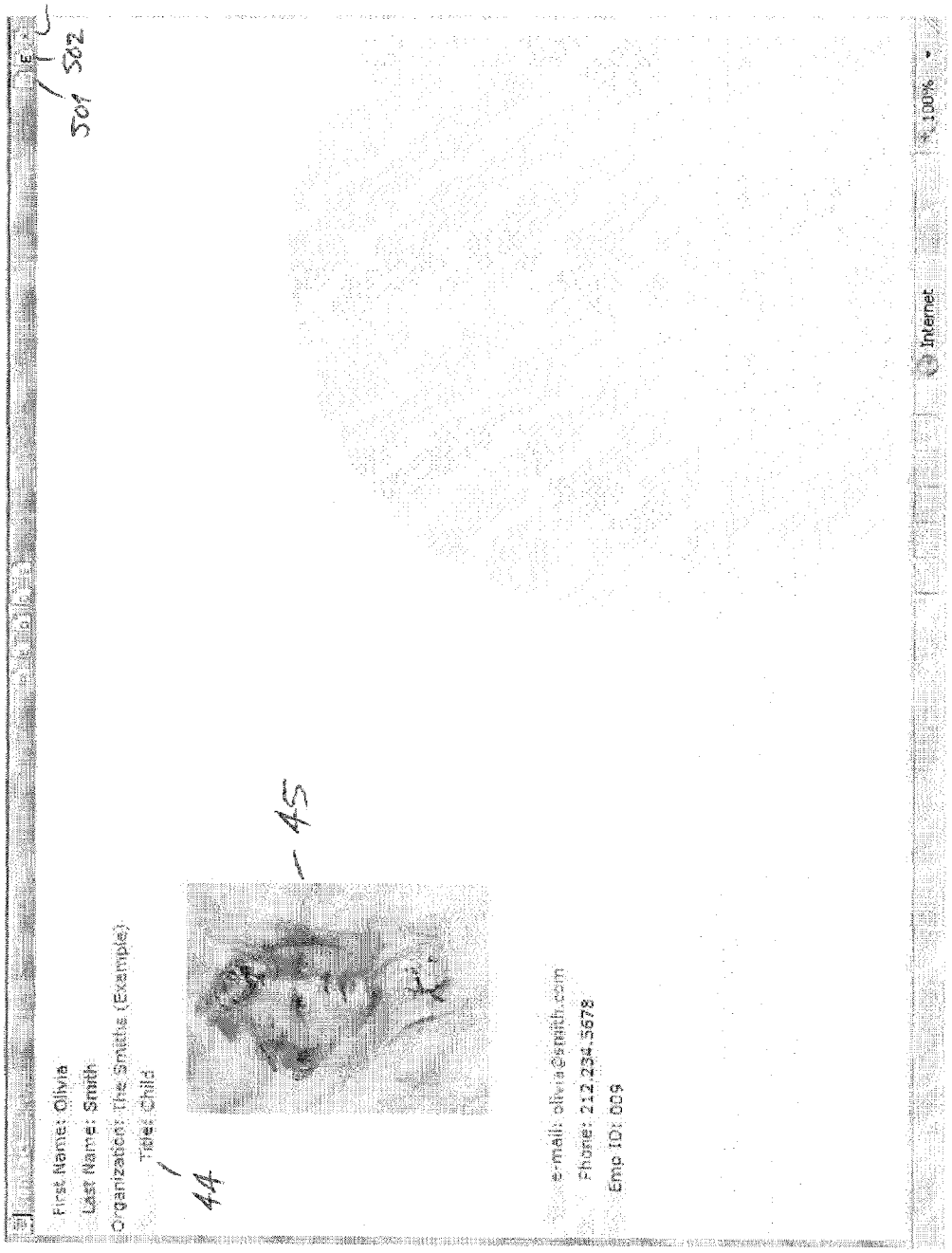
FIG. 8B shows a detailed directory listing displayed on a computer screen, according to an embodiment of the present invention.

Referring to FIG. 8A, when a user clicks on the directory 40 in the navigation control cluster 10, the user is provided with an alphabetical listing of members of the organization, for example, the employees of a business. Contact information, such as telephone number 41 and e-mail address 42 are provided for each person. As shown in FIG. 8B, a user can link from the alphabetical list of FIG. 8A to a more detailed description of a member of the organization. The more detailed description can include a picture 45 of the individual and her title 44.

Figure 9:
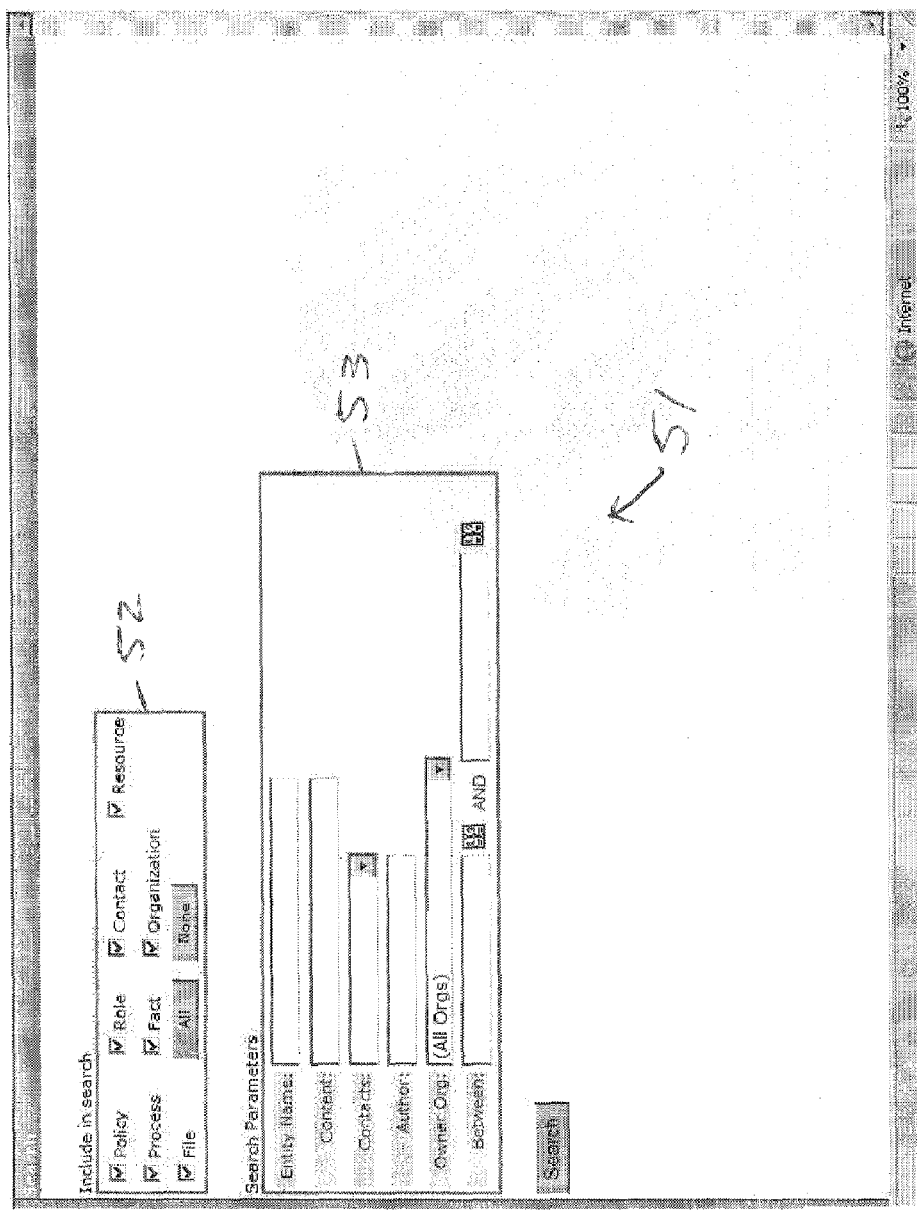
FIG. 9 shows a search form displayed on a computer screen, according to an embodiment of the present invention.

A user also has the ability to perform searches within the system. For example, if a user clicks on search 50 in the navigation control cluster 10, a search form 51 shown in FIG. 9 is displayed on the screen. As shown in box 52, a user can define the search to include subject matter falling under one, some or all of the types of information listen therein. For example, if a user wants to search exclusively for policies and facts, the user will check only the boxes corresponding to policies and facts. As shown in box 53, the user may further define the search by name, content (e.g., key words), author, category, organization and date. Upon running a search, a user may click on any of the search results to view desired pages.

Category within the contents of the search screen in box 53 refers to user-defined categories beyond the provided taxonomy of policies 100, processes 200, roles 300 and facts 400. The user-defined categories may be organization specific. In other words, an organization may elect to further categorize its information into categories specific to its particular requirements or industry's terminology. For example, in addition to policies, processes, roles and facts, a zoo might utilize categories such as reptiles, birds and mammals to further pinpoint organizational information. The application allows for creation of a user-defined taxonomy that can be utilized in the application's search engine. By clicking on categories 65 in the navigation control cluster 10, a list of the user-defined categories will be displayed. Users may click on the user-defined categories to display the information assigned thereto.

By clicking on dashboard 60 in the navigation control cluster 10, a user can get quick summary information about the system including, for example, the number of policies, processes, roles and facts for each organization and when files including organization information, such as policies, processes, roles and facts, were created or added to the system and/or modified. By clicking on image store 70, a user is provided with quick access to each image in the system, preferably listed alphabetically by file name. A user can view an image by clicking on the image file name.

The navigation control cluster 10 also includes an administration area 80, which includes categories for Security 81 and Help 83. The security area 81 may include employee information such as user identification names and level of security clearance for each user. Preferably, only administrators of the system can access the security area 81.

If a user clicks on the help area 83, the user is provided with a listing (preferably alphabetical) of terms that may require a definition and/or a list of frequently asked questions (FAQs). A user can click on a term or FAQ to display a definition or an answer. In addition, if a user seeks a definition of a category or sub-category, such as policies 100, processes 200, roles 300, facts 400 and their respective sub-categories, or a definition of a field in a description (e.g., triggers 224 and pre-conditions 225 in FIG. 5B), the user can place a cursor over the category, sub-category or field and press the right mouse button to display the definition. Definitions and answers to FAQs, whether displayed through a help menu or by right clicking a mouse, can include hyperlinks to further descriptions.

Figure 10:
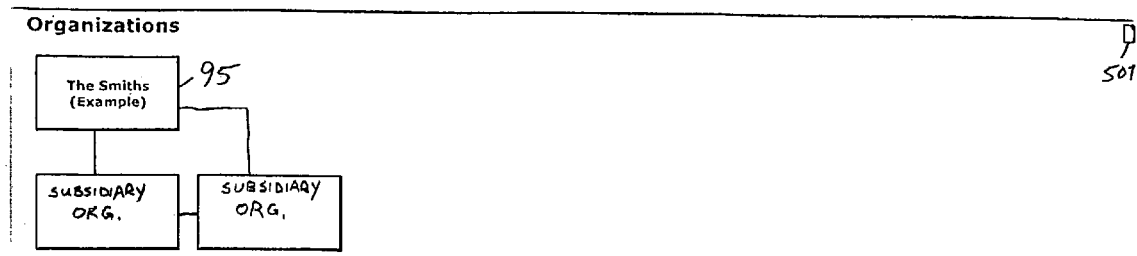
FIG. 10 shows a diagram of organizations displayed on a computer screen, according to an embodiment of the present invention.

As shown in FIGS. 3A and 3B, the navigation control cluster 100 includes an area 90 referencing the organization. For illustrative purposes, the organization is The Smiths. Referring to FIG. 10, if a user clicks on the arrow cluster 91 above the organization name, a user is provided with a diagram of the structure of the organization including any parent or subsidiary organizations. If a user clicks on an organization block 95, a description of the organization is displayed on the screen. The description can include the name of the organization, its parents or subsidiaries, its mission and any relevant contacts.

Users, depending on their privileges, may have the right to edit, delete and/or add information to the system. A user, for example, can delete, add or edit the content of existing policies 100, processes 200, roles 300 and facts 400. As shown in FIGS. 5A-5D, for example, the pages displaying organizational information include a new page icon 501, an edit page icon 502 and a delete page icon 503. Referring to FIG. 11, if a user is viewing a page and clicks on the edit icon 502, the page that was being viewed is displayed in an edit mode. As shown in FIG. 11, the FIG. 5B page is displayed in an editor, for example. The editor is preferably an HTML editor or other editor known to one of ordinary skill in the art.

While in edit mode, a user is free to change or add to the information fields, such as the official name 221, AKA(s) 222, overview 223, triggers 224, pre-conditions 225, flow-of-events 226, organization 227 and contacts 228. A user also can specify who is able to view the page by designating the visibility 529 of the page as public or private. Further, a user can specify a user-defined category 530 for the information, for example, reptiles, birds and mammals in the case of a zoo as discussed above.

A user is free to add hyperlinks for any of the words or phrases in the narrative to other pages within the system or to external web pages. For example, if a user wishes to hyperlink the word "bulb" in the overview section 223 to the page shown in FIG. 6, the user highlights the word "bulb" and moves the cursor to the "Link To" drop down menu 551. The link menu 551 includes choices for specifying a link to a "policy", "policy work product", "policy oversight", "policy infrastructure", "process", "process work product", "process oversight", "process infrastructure", "role", "fact", "fact application", "fact database", "fact external", "fact form", "fact other", "fact report", "fact subject matter expert", "fact template" and "help topic". In this instance, the user selects "fact external", is provided with a menu of external fact pages in the system and selects the external fact page corresponding to FIG. 6. In doing so, the user has established the link for a description of the word "bulb".

Similarly, if a user wishes to add an external hyperlink to the page, the user highlights the term for linking and selects the "insert hyperlink" button 553. Then, when prompted, the user types an external web address to establish the link thereto. Users may also remove hyperlinks by highlighting a hyperlinked term and clicking on the "remove hyperlink" button 552.

Users may also add images or any other multi-media content to a narrative, such as the shopping list form image 426 shown in FIG. 5D. The user places the cursor in a location for adding the image and clicks on the "insert image" button 554, which provides the user with a list of images in the system similar to the list displayed when the user clicks on image store 70. The user is able to select the desired image from the list for insertion into the narrative.

If a user clicks on the new icon 501, the user can create a new page in the system, such as a process, policy, role or fact. It should be understood that a user with appropriate clearance can create and edit all pages in the system. For example, in order to create a new work product related policy, the user may click on work product related policy 101 in the navigation control cluster 10 and then click on the new icon 501 to display a policy page in the editor. Similarly, if a user wishes to create a new help topic, the user can click on the new icon 501 from a help page or menu. The user will be provided with an appropriate data entry mask with relevant fields of information pertaining to the subject matter being inputted (e.g., policy statement 127 for a policy, flow-of-events 226 for a process, topic and description for a help topic). If users want to delete a page that they are viewing, the users can click on the delete icon 503.

When adding new information for an organization, a user must make a determination as to the appropriate category and sub-category to which the information applies. To assist the user in making the appropriate determination, the user can utilize the help area 83 or right click on category, sub-category and field terms to review definitions thereof.

It is to be understood that the embodiments of the present invention are not limited to the editing formats described and that other editing means known to those of ordinary skill in the art may be employed.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for categorizing information of an organization, comprising:
   presenting a user interface to a user for inputting the information, the user interface comprising a plurality of primary categories consisting of a policy category, a process category, a role category and a fact category;
   allowing the user to select the plurality of primary categories;
   allowing the user to input under the plurality of primary categories the information pertaining to the plurality of primary categories, wherein:
      for the policy category, the inputted information consists essentially of a directive or statement to provide guidance in support of organizational decisions or activities so that processes crafted or actions taken conform with or support a mission of the organization,
      for the process category, the inputted information consists essentially of a flow of events detailing a pursuit for the organization,
      for the role category, the inputted information consists essentially of a function performed in a particular operation or process, and
      for the fact category, the inputted information consists essentially of something that exists, something that has been demonstrated to exist,
   something known to have existed or something that has been done;
   storing the information of the organization in a central computer system accessible by a plurality of users; and
   providing the plurality of users with access to the information of the organization via the plurality of primary categories.

2. The method as recited in claim 1, wherein the plurality of primary categories each include a sub-category and the method further comprises allowing the user to input under the sub-category the information pertaining to the sub-category.

3. The method as recited in claim 1, wherein the user interface further comprises the policy category divided into at least one of a work product category, an oversight category and an infrastructure category.

4. The method as recited in claim 1, wherein the user interface further comprises the process category divided into at least one of a work product category, an oversight category and an infrastructure category.

5. The method as recited in claim 1, wherein the user interface further comprises the fact category divided into at least one of an application category, a database category, an external category, a form category, an other category, a report category, an expert category and a template category.

6. The method as recited in claim 1, wherein the user inputs the information pertaining to the plurality of primary categories by filling in a plurality of predetermined data entry fields.

7. The method as recited in claim 6, wherein the plurality of predetermined data entry fields includes at least one of a name field, an overview field and a contact field.

8. The method as recited in claim 6, wherein the plurality of predetermined data entry fields includes at least one of a target field, a trigger field, a pre-condition field, and a flow-of-events field.

9. The method as recited in claim 1, wherein the user specifies accessibility to the inputted information.

10. The method as recited in claim 1, further comprising allowing the user to add a hyperlink from the inputted information in one of the plurality of primary categories to the inputted information in another one of the plurality of primary categories.

11. The method as recited in claim 1, further comprising displaying the inputted information in the plurality of primary categories.

12. The method as recited in claim 1, further comprising searching for inputted information, wherein one or more of the plurality of primary categories is specified as a search parameter.

13. A program storage device readable by a machine, tangibly embodying a program of instructions executable by the machine to perform method steps for categorizing information of an organization, the method steps comprising:
   presenting a user interface to a user for inputting the information, the user interface comprising a plurality of primary categories consisting of a policy category, a process category, a role category and a fact category;
   allowing the user to select the plurality of primary categories;
   allowing the user to input under the plurality of primary categories the information pertaining to the plurality of primary categories, wherein:
      for the policy category, the inputted information consists essentially of a directive or statement to provide guidance in support of organizational decisions or activities so that processes crafted or actions taken conform with or support a mission of the organization,
      for the process category, the inputted information consists essentially of a flow of events detailing a pursuit for the organization,
      for the role category, the inputted information consists essentially of a function performed in a particular operation or process, and
      for the fact category, the inputted information consists essentially of something that exists, something that has been demonstrated to exist,
   something known to have existed or something that has been done;
   storing the information of the organization in a central computer system accessible by a plurality of users; and
   providing the plurality of users with access to the information of the organization via the plurality of primary categories.

14. The program storage device as recited in claim 13, wherein the plurality of primary categories each include a sub-category and further comprising instructions for allowing the user to input under the sub-category the information pertaining to the sub-category.

15. The program storage device as recited in claim 13, wherein the user interface further comprises the policy category divided into at least one of a work product category, an oversight category and an infrastructure category.

16. The program storage device as recited in claim 13, wherein the user interface further comprises the process category divided into at least one of a work product category, an oversight category and an infrastructure category.

17. The program storage device as recited in claim 13, wherein the user interface further comprises the fact category divided into at least one of an application category, a database category, an external category, a form category, an other category, a report category, an expert category and a template category.

18. The program storage device as recited in claim 13, wherein the user inputs the information pertaining to the plurality of primary categories at by filling in a plurality of predetermined data entry fields.

19. The program storage device as recited in claim 18, wherein the plurality of predetermined data entry fields includes at least one of a name field, an overview field and a contact field.

20. The program storage device as recited in claim 19, wherein the plurality of predetermined data entry fields includes at least one of a target field, a trigger field, a precondition field, and a flow-of-events field.

21. The program storage device as recited in claim 13, further comprising instructions for allowing the user to specify accessibility to the inputted information.

22. The program storage device as recited in claim 13, further comprising instructions for allowing the user to add a hyperlink from the inputted information in one of the plurality of primary categories to the inputted information in another one of the plurality of primary categories.

23. The program storage device as recited in claim 13, further comprising instructions for displaying the inputted information pertaining to one of the plurality of primary categories when the user selects the one of the plurality of primary categories.

24. The program storage device as recited in claim 13, further comprising instructions for searching for inputted information, wherein one or more of the plurality of primary categories is specified as a search parameter.

25. A system for categorizing information of an organization, comprising:
 a user terminal presenting a user interface to a user for inputting the information, the user interface comprising a plurality of primary categories consisting of a policy category, a process category, a role category and a fact category, wherein the user, via the user terminal, selects the plurality of primary categories, and inputs under the plurality of primary categories the information pertaining to the plurality of primary categories, wherein:
  for the policy category, the inputted information consists essentially of a directive or statement to provide guidance in support of organizational decisions or activities so that processes crafted or actions taken conform with or support a mission of the organization,
  for the process category, the inputted information consists essentially of a flow of events detailing a pursuit for the organization,
  for the role category, the inputted information consists essentially of a function performed in a particular operation or process, and
  for the fact category, the inputted information consists essentially of something that exists, something that has been demonstrated to exist,
 something known to have existed or something that has been done; and
 a central computer system connected to the user terminal via an information network, wherein the central computer system stores the inputted information, and the user accesses the inputted information via the plurality of primary categories.

26. A method for displaying categorized information of an organization, comprising:
 presenting a user interface to a user for displaying the information, the user interface comprising a plurality of primary categories consisting of a policy category, a process category, a role category and a fact category;
 allowing the user to select the plurality of primary categories; and
 displaying the information pertaining to the plurality of primary categories, wherein:
  the information pertaining to the policy category consists essentially of a directive or statement to provide guidance in support of organizational decisions or activities so that processes crafted or actions taken conform with or support a mission of the organization,
  the information pertaining to the process category consists essentially of a flow of events detailing a pursuit for the organization.
  the information pertaining to the role category consists essentially of a function performed in a particular operation or process, and
  the information pertaining to the fact category consists essentially of something that exists, something that has been demonstrated to exist, something known to have existed or something that has been done.

27. A server connected to at least one client through a network, wherein the server includes a computer readable code embodied therein for causing a computer to perform method steps for categorizing information of an organization, comprising:
 forwarding from the server to the at least one client a first interface for selecting a plurality of primary categories, wherein the plurality of primary categories consist of a policy category, a process category, a role category and a fact category;
 receiving at the server selections of the plurality of primary categories at from the at least one client;
 forwarding a second interface for inputting under the plurality of primary categories the information pertaining to the plurality of primary categories from the server to the at least one client in response to the received selections;
 receiving at the server inputted information pertaining to the plurality of primary categories from the at least one client;
 storing at the server the inputted information;
 forwarding a third interface for accessing the inputted information via the plurality of primary categories from the server to the at least one client;
 receiving at the server a request for the inputted information via the plurality of primary categories from the at least one client; and
 forwarding the inputted information from the server to the at least one client, wherein:
  the information pertaining to the policy category consists essentially of a directive or statement to provide guidance in support of organizational decisions or activities so that processes crafted or actions taken conform with or support a mission of the organization, the information pertaining to the process category consists essentially of a flow of events detailing a pursuit for the organization, the information pertaining to the role category consists essentially of a function performed in a particular operation or process, and the information pertaining to the fact category consists essentially of something that exists, something that has been demonstrated to exist, something known to have existed or something that has been done.

28. The server as recited in claim 27, wherein the plurality of primary categories each include a sub-category and the second interface permits the at least one client to input under the at least one sub-category the information pertaining to the sub-category.

29. The server as recited in claim 27, wherein the policy category is divided into at least one of a work product category, an oversight category and an infrastructure category.

30. The server as recited in claim 27, wherein the process category is divided into at least one of a work product category, an oversight category and an infrastructure category.

31. The server as recited in claim 27, wherein the fact category is divided into at least one of an application category, a database category, an external category, a form category, an other category, a report category, an expert category and a template category.

32. The server as recited in claim 27, wherein the second interface includes a plurality of predetermined data entry fields.

33. The server as recited in claim 32, wherein the plurality of predetermined data entry fields includes at least one of a name field, an overview field and a contact field.

34. The server as recited in claim 32, wherein the plurality of predetermined data entry fields includes at least one of a target field, a trigger field, a pre-condition field, and a flow-of-events field.

35. The server as recited in claim 27, wherein the method steps further comprise receiving at the server a designation of accessibility to the inputted information from the at least one client.

36. The server as recited in claim 27, wherein the method steps further comprise receiving at the server from the at least one client an addition of a hyperlink from the inputted information in one of the plurality of primary categories to the inputted information in another one of the plurality of primary categories.

37. The server as recited in claim 27, wherein the method steps further comprise forwarding a display of the inputted information pertaining to the plurality of primary categories from the server to the at least one client.

38. The server as recited in claim 27, wherein the method steps further comprise receiving and processing a search request for the inputted information at the server from the at least one client, wherein one or more of the plurality of primary categories is specified as a search parameter.

* * * * *